Patented Feb. 4, 1936

2,029,530

UNITED STATES PATENT OFFICE 2,029,530

CONTACT SULPHURIC ACID PROCESS

Alphons O. Jaeger, Mount Lebanon, Pa., assignor, by mesne assignments, to American Cyanamid & Chemical Corporation, a corporation of Delaware No Drawing. Application May 29, 1931, Serial No. 541,118

7 Claims. (Cl. 23—175)

This invention relates to the catalytic oxidation of sulphur dioxide to sulphur trioxide, the contact sulphuric acid process, in the presence of a new class of catalysts.

In the past it has been proposed to use vanadium catalysts for the oxidation of sulphur dioxide, which catalysts are supported by a carrier consisting of diatomaceous particles which have been fired to 1,000° C. to produce a hard and permanent bond and then broken into pieces.

According to the present invention, diatomaceous carriers are used having considerably different properties, which carriers are preferably given a pretreatment before being associated with the active catalytic material in order to produce a contact mass having more desirable characteristics. Such substances as "Silocel C-22" insulating brick, which is a brick prepared from diatomaceous earth together with a slight amount of bonding clay and calcined at approximately 2,000° F., "Silocel C-3" which is natural diatomite brick which has been calcined to about 2,000° F. and which contains no bonding agent and tridymite brick, which is a brick formed of diatomaceous material with 1–3% of lime and fired at temperatures up to 2400° F., are used as starting materials from which carriers can be prepared (Calvert "Diatomaceous Brick" 1930). Raw or uncalcined diatomaceous brick may also be used for this purpose and in some cases where special requirements must be met, other forms of diatomite brick especially prepared and containing other components may be used to advantage.

Natural or artificially prepared diatomite brick fragments of this type present many advantages over the use of finely divided diatomite particles such as have formerly been produced for admixture with vanadium compounds in the preparation of catalysts for the contact sulphuric acid process. When the catalytically active material is admixed with the carrier in finely divided form it is often difficult to obtain a catalyst pellet of suitable physical strength and there is always present the difficulty of introducing promoters and stabilizers in the desired amounts without causing undesired reaction between these and the effective catalytic material itself. When diatomite brick fragments of the type described are used their porous structure permits impregnation with any desired amounts of stabilizers, promoters and other activators and tuning agents for the catalyst, and I have found that such substances when introduced in this manner will exert a very favorable action on an effective catalyst impregnated into or distributed over the surface of the carrier particle. Such stabilizers and promoters can also be associated, of course, with the effective catalytic material on the surface of the brick fragments and it is an advantage of the present invention that exactly the right amounts and proportions of catalysts, stabilizers and promoters can be obtained by introducing a part of the latter within the pores of the carrier fragments and a part in admixture with the specific catalytic material, whether the latter is entirely on the surface or in part impregnated into the pores of the carrier.

Fragments of synthesized diatomite brick may also be used in which the brick has been made up with materials which will exert a stabilizing and promoting action. This method of preparation not only produces a highly effective sulphuric acid catalyst, but also presents many advantages in the preparation of the brick fragments themselves. Many of the stabilizers, that is to say compounds of the alkali and alkaline earth metals, are well known as fluxing agents, while such promoters as alumina, titania, iron oxide, beryllium oxide and the like add the desirable qualities of toughness and hardness to the brick. In firing brick containing these substances not only can a much lower firing temperature be used with a corresponding increase of over-all strength of the brick, but also a uniform distribution of these substances throughout the whole mass is insured. The presence of these substances in the preformed brick particles is also an advantage when further impregnation is to be effected for they react chemically with other impregenating materials, particularly after the prepared catalyst has been put into use, and form a product which is highly resistant to deterioration under the severe conditions of use.

The stabilizers which can be used in preparing the sulphuric acid catalysts are, as is well known, compounds of the alkali and alkaline earth metals or mixtures thereof and may be introduced in the form of oxides, hydroxides or salts. The promoters are compounds of silver, copper, beryllium, zinc, cadmium, boron, aluminum or metals of the 4th to the 8th groups of the periodic system which are catalytically active but which have no specific catalytic activity for the oxidation of sulphur dioxide to sulphur trioxide. By promoter I mean compounds having little or no activity for the oxidation of sulphur dioxide and which when used alone will not give commercially useful percentage yields but which, when associated with a vanadium catalyst on a carrier, will improve the conversion efficiency thereof in this reaction. Thus the term "promoter" means a catalyst which enhances chemically the catalytic activity of a vanadium catalyst when used on a carrier in the oxidation of $SO_2$ to $SO_3$, although having no unusual power to catalyze this reaction when used alone. The best promoter of which I am aware is aluminum in chemical combination. The catalytically effective components which may be coated upon the surfaces of the carrier particles or impregnated into them, or both, may be compounds of such specific sulphuric acid catalysts as iron, titanium, molybdenum or tungsten, but I have found that the preferred catalysts are those which contain vanadium, preferably in its tetravalent or pentavalent form. These substances may be introduced either singly or in admixture, in any desired form, but wherever possible the use of metal oxides or metallates is preferred. The advantage of the use of metallates lies in the fact that these may be combined with the stabilizer or promoters, or both, to produce an intimate mixture and uniform action, and the possibility of introducing further amounts of substances by impregnation into the diatomite brick fragments permits the use of this type of coating material with no difficulty in obtaining proper proportions. Impregnation with complex compounds which are not base exchange bodies such as potassium aluminum polyvanadate, and successive impregnations with materials which will react to produce complex compounds of other types may also be used, the impregnation preferably being effected by spraying suspensions or solutions of the desired material onto the heated carrier fragments.

The invention will be further described in conjunction with the following examples which are for illustrative purposes and to which it is not limited.

Example 1

300 cc. of natural amorphous diatomaceous earth, such as that obtained from the Lompoc deposits in California, containing approximately 90% silica, 4% alumina and small amounts of iron, lime and magnesia, are impregnated with a solution containing 76 grams $Al_2(SO_4)_3.18H_2O$, or equivalent amounts of salts of copper, cobalt, nickel or mixtures of these. The material is evaporated to dryness, formed into bricks, and heated to incipient fusion, which takes place at temperatures of 1860–2100° F. The calcined brick is broken into particles of 6–8 mesh and impregnated with 27.2 grams sodium metavanadate, the impregnation being effected by spraying the metavanadate solution in such a manner that part of the catalytically active material is impregnated into the pores of the brick while the major portion remains on the surface. The contact mass so formed is heated in air or dilute $SO_2$ to 200–250° C., after which 7% burner gases are passed over it at 400–500° C. being transformed into $SO_3$ with conversion yields of 96–97.5%.

Instead of pure sodium metavanadate, a solution containing aluminum, copper, nickel, or cobalt salts may be mixed with the impregnating solution and the suspension so formed used as the impregnating medium. In this case, of course, the amount of promoter incorporated with the diatomaceous earth will be correspondingly reduced.

Example 2

360 cc. of diatomaceous earth, such as that found at Clermont, Florida and which consists entirely of silica and organic material, is heated to high temperatures in the presence of air to burn out impurities and after cooling is impregnated with a solution of 19 grams $Al(OH)_3$ in 110 grams of a 20% sodium hydroxide solution. The impregnated mass is formed into bricks and fired at about 1800° F. The fired brick is broken into pea sized fragments and impregnated with a solution of 23.4 grams ammonium vanadate.

Instead of introducing the promoter into the diatomaceous earth before firing the brick, natural or artificially prepared diatomite brick consisting of pure silica may be fired at slightly higher temperatures and then impregnated with the sodium aluminate solution, followed by impregnation or coating with the ammonium metavanadate.

The contact mass so obtained is calcined in the usual manner and gives yields of 97–98.2% $SO_3$ when 7% burner gases are passed over it at temperatures of 425–500° C.

Example 3

270 cc. of calcined natural amorphous diatomaceous earth, such as that sold in the trade as "Silocel C-3", are impregnated with a solution containing 7 grams of 100% sodium hydroxide in 100 cc. of water and then with a moderately concentrated solution of 6.4 grams copper nitrate. The material is formed into bricks and heated to incipient fusion, and after cooling the brick is broken into fragments of 6–8 mesh. These fragments are heated in a porcelain dish and coated with a solution containing 9 grams ammonium metavanadate, 10 grams sodium metavanadate and 7 grams ammonium heptamolybdate, the fragments being continuously stirred during coating in order that an even impregnation may be obtained.

In the preparation of the brick, the copper nitrate may be replaced in whole or in part by salts of bismuth, cadmium, lead, beryllium and the like, while the sodium may be replaced by other alkali metals or by oxides or salts of metals of the alkaline earth group.

The catalysts so obtained are calcined in the usual manner and give excellent yields of $SO_3$ when 7% burner gases are passed over them at the usual temperatures.

Example 4

250 cc. of 6–8 mesh particles of "Silocel Super Brick", a pressed and burned brick composed of "Silocel" powder together with a slight amount of bonding clay, calcined to about 2500° F., and in which the Silocel has gone through a chemical change to take the form of tridymite, are impregnated with a solution containing 10.3 grams of copper nitrate, or corresponding amounts of nitrates of tin, zinc, or titanium. The impregnated particles are then coated with a solution containing 17 grams ammonium metavanadate as in Example 1.

The impregnated fragments are calcined at temperatures of 200–300° C. and form excellent catalysts for the contact sulphuric acid process.

Example 5

400 cc. of amorphous diatomaceous material such as that described in previous examples, are impregnated with a solution of 14 grams calcium nitrate and afterwards with a solution containing 12 grams sodium hydroxide, the impregnated material is formed into bricks, calcined at temperatures up to 2400° F., and broken into pieces, which are coated or impregnated with a solution containing 21.8 grams ammonium metavanadate.

Instead of incorporating the alkali forming metal compounds into the amorphous diatomaceous earth, fragments of suitable diatomite bricks may be impregnated with solutions of these compounds and coated in the same manner.

The coated fragments are calcined in air or dilute $SO_2$ gases to form vanadium pentoxide and are then filled into a converter designed to maintain a suitable temperature gradient through the catalyst and 7% $SO_2$ gases are passed over them. Yields up to 98% of $SO_3$ are obtained when a temperature gradient of 500–425° C. is maintained through the catalyst in the direction of gas flow.

Example 6

320 cc. "Silocel Brick" is broken into fragments of suitable size and impregnated with a solution of 17.5 grams ammonium vanadate, 4.0 grams aluminum hydroxide and 41 grams potassium hydroxide in 250 cc. of water. The impregnated material is dried and calcined at 200–300° C., which causes formation of a non-base exchanging potassium aluminum polyvanadate within the pores of brick fragments. The calcined material is filled into a converter and is an excellent contact mass for the oxidation of sulphur dioxide to sulphur trioxide.

In the specification and claims, the term "metallate" is used to cover the salts of metal acids such as, for example, sodium or potassium aluminate.

The term "tridymite" refers to a mineral (also known as asmanite) occurring in rhombic bipyramidal (pseudohexagonal) crystals having axial inclinations of $a: b: c:=0.5774: 1:0.9544$. It is extensively described in Gmelin-Kraut's "Handbuch der anorganischen Chemie", Band 111, Abteilung 1, p. 135.

In my prior Patent No. 1,657,754 I have described catalysts in which compounds of catalytically active metals are incorporated into base exchange bodies, notably zeolites. These zeolites, by reason of their microporous structure and high surface activity, operate as powerful physical activators for the vanadium compounds and other catalysts associated therewith, and produce the most highly active sulphuric acid catalysts that have so far been developed. In fact, this physical activation is so great that it completely masks the action of any chemical promoter that may be present as a zeolite component or diluent, and renders it impossible to determine the effect of such promoters on the action of vanadium compounds if used independently of a zeolite. Accordingly I have used the term "non-base exchanging compound of vanadium" in the present claims to define a vanadium catalyst which is free from this physical activation imparted by zeolites and which is therefore capable of being chemically activated by association with a promoter.

What is claimed as new is:

1. A process of oxidizing sulphur dioxide to sulphur trioxide, which comprises bringing about reaction between sulphur dioxide and oxygen containing gases in the presence of a catalyst comprising massive fragments of diatomite brick with which are associated at least one non-base exchanging catalytically active compound of vanadium and at least one promoter.

2. A process according to claim 1, in which the specific catalyst is coated upon the prepared diatomaceous brick fragments.

3. A process according to claim 1, in which the specific catalyst includes a vanadate of an alkali forming metal.

4. A process of oxidizing sulphur dioxide to sulphur trioxide, which comprises bringing about reaction between sulphur dioxide and oxygen containing gases in the presence of a catalyst comprising massive fragments of diatomite brick which has been prepared by firing diatomaceous material containing a compound of aluminum, said fragments having associated therewith at least one non-base exchanging compound of vanadium.

5. A process according to claim 4, in which the vanadium compound is sprayed upon the prepared diatomite fragments.

6. A process of oxidizing sulphur dioxide to sulphur trioxide, which comprises bringing about reaction between sulphur dioxide and oxygen containing gases in the presence of a catalyst comprising massive fragments of diatomite brick which has been prepared by firing diatomaceous material containing a compound of aluminum and another promoter, said fragments having associated therewith at least one non-base exchanging compound of vanadium.

7. A process according to claim 1, in which a compound of an alkali forming metal is also incorporated with the diatomaceous material and the diatomite brick is heated under such conditions as to produce appreciable percentages of tridymite.

ALPHONS O. JAEGER.